United States Patent [19]

West et al.

[11] 4,181,879
[45] Jan. 1, 1980

[54] MINE SEARCH COIL SIMULATOR

[75] Inventors: Gaylon L. West, Ridgecrest, Calif.; John M. Boyle, King George, Va.

[73] Assignee: United States of America as represented by the Secretary of the Navy, Washington, D.C.

[21] Appl. No.: 877,546

[22] Filed: Feb. 13, 1978

[51] Int. Cl.² .............................................. G01V 3/10
[52] U.S. Cl. ..................................... 324/326; 324/345
[58] Field of Search .................. 324/3, 7, 8, 6, 244

[56] References Cited

U.S. PATENT DOCUMENTS

| | | | |
|---|---|---|---|
| 2,624,778 | 1/1953 | Perlow et al. | 324/3 |
| 3,020,470 | 2/1962 | Shawhan et al. | 324/3 |
| 3,202,909 | 8/1965 | Stewart | 324/3 |
| 3,304,495 | 2/1967 | Brown | 324/3 UX |
| 3,315,155 | 4/1967 | Colani | 324/6 |
| 3,355,658 | 11/1967 | Gardiner | 324/3 |
| 3,530,375 | 9/1970 | Passier | 324/244 X |
| 3,679,969 | 7/1972 | Fussell | 324/244 |
| 3,697,870 | 10/1972 | Brenner | 324/244 |
| 3,889,179 | 6/1975 | Cutler | 324/3 |
| 3,988,663 | 10/1976 | Slough et al. | 324/3 |

Primary Examiner—Gerard R. Strecker
Attorney, Agent, or Firm—R. S. Sciascia; W. Thom Skeer; Thomas W. Hennen

[57] ABSTRACT

A passive inductor and associated circuitry which enables a compact search coil to simulate the response characteristics of a service mine search coil having different electrical properties. Output from the passive inductor is amplified and modified to duplicate frequency response characteristics at ship frequency, magnetic sensitivity, and output impedance of a larger search coil. Provision is made for disengagement of magnetic surveillance by the inductor.

5 Claims, 2 Drawing Figures

MINE SEARCH COIL SIMULATOR

BACKGROUND OF THE INVENTION

1. Field of the Invention

This invention pertains to metal detecting search coils, and more particularly to passive search coils.

2. Description of the Prior Art

Prior search coils, such as those used in actuation mines which are planted underwater in the vicinity of marine traffic, must have carefully preselected magnetic sensitivities and frequency responses. These service mine coils are bulky, and may extend a distance of five feet or more. In an actuation mine simulator, such as that used in mine training exercises, the space available for the coil is usually much less, permitting the use of only a twelve inch to fifteen inch long search coil. In order for the training experience gained by utilizing the mine simulator to be valid, the search coil must have response characteristics identical to the larger service mine coil.

Prior mine simulators have been bulky because they have required use of actual service mine search coil components for the particular service mine being simulated. This results in an excessively bulky training device.

SUMMARY OF THE INVENTION

The problems and inconveniences of the prior art are overcome by the present invention which includes a passive inductor coupled with amplifying and adjusting circuitry for causing the response characteristics of the inductor to simulate those of a full-size service mine search coil. The amplification circuitry includes variable resistors for providing gain control of an operational amplifier.

The inductor used is a compact coil assembly comprising four separate coils wound about a common metallic core and connected in series. A light emitting diode and phototransistor pair couple reset pulses from an external source with switching means to decouple the inductor output signal from the operational amplifier to allow signals induced by eddy current to damp out.

BRIEF DESCRIPTION OF THE DRAWINGS

Further advantages of the present invention will emerge from a description which follows of the preferred embodiment of an underwater search coil according to the invention, given with reference to the accompanying drawing figures, in which.

DESCRIPTION OF THE PREFERRED EMBODIMENT

Figure 1:
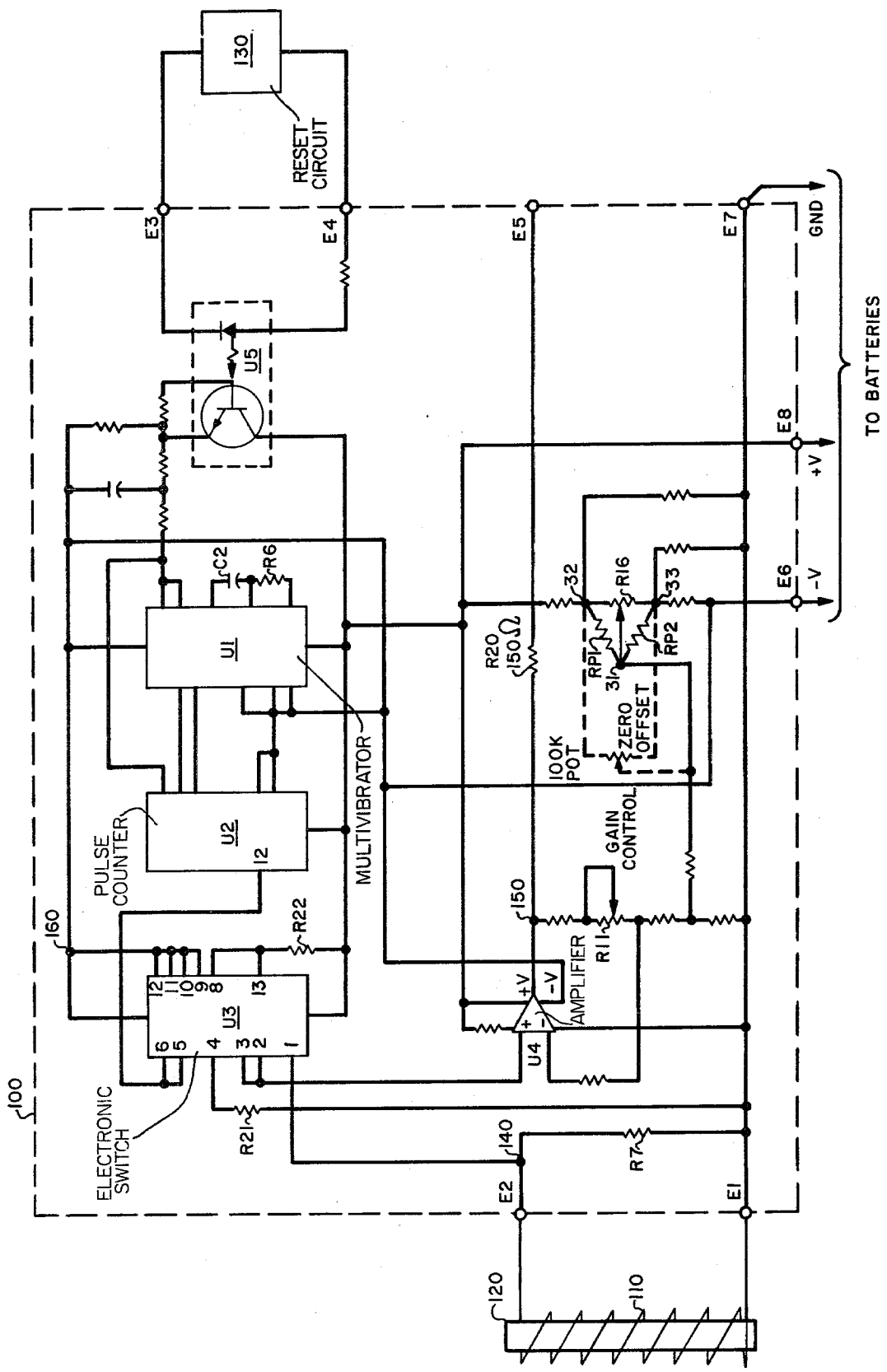
FIG. 1 illustrates an electrical schematic diagram of the present invention.

An underwater search coil simulator according to the present invention is shown schematically in FIG. 1. Referring now to FIG. 1, there is shown inductor 110 having metallic core 120. Inductor 110 is passively coupled to circuitry within box 100 at points E1 and E2. Reset circuit 130 is coupled to circuitry within box 100 at points E3, and E4. Power is supplied to the circuitry within box 100 at points E6 and E8, point E7 being a common ground. Passive inductor 110 carries load R7. Current induced in inductor 110 by the motion of a remote ferrous body, such as a ship, is normally tapped at 140 and directed to switch U3 from input pin 1 to output pin 2 to operational amplifier U4. Output from amplifier U4 is then directed through output impedance matching resistor R20 to output point E5. A resistive feedback network senses output at 150 and, by means of gain control variable resistor R11, provides an adjustment to control amplifier U4. The gain of amplifier U4 is adjusted to obtain a desired signal output at point E5. Zero offset variable resistor R16 enables control to amplifier U4 output so that currents induced by ambient magnetic fields may be eliminated, and accurate remote metallic object or ferrous body sensing by inductor 110 accomplished.

The input induced current from inductor 110 is disconnected from U4 by U3, which is an electronic switch having four sections. Switching contact is normally made between switch contacts 1 and 2, 3 and 4, 8 and 9, and 10 and 11. These switches are controlled by pin 13 for contacts 3 and 4, pin 5 for contacts 1 and 2, pin 6 for contacts 8 and 9, and pin 12 for contacts 10 and 11. In the normal operating mode, switch contacts 1 and 2 are closed and switch contacts 3 and 4, and 9 and 10 are open. Switch contacts 10 and 11 and control pin 12 are not used and are tied to the minus supply bus at point 160.

Disconnection of inductor 110 from amplifier U4 is initiated when phototransistor U5 is activated by an externally applied control signal at pins E3 and E4. When this control signal is received, phototransistor U5 conducts, activating astable multivibrator U1. This produces an output pulse at pin 12 of pulse counter U2. This output pulse stays on according to the RC time constant determined by R6 and C2.

The output pulse from U2 is connected to pins 5 and 6 of switch U3 and causes switch contacts 3 and 4 and 8 and 9 to close. When switch contacts 3 and 4 close, R21 is connected to ground across the input of amplifier U4. The closure of 8 and 9 causes switch pin 13 to go low from its normal high, which opens switch contacts 1 and 2, to disconnect inductor 110 from the positive input of amplifier U4.

The unit will stay in this condition until the control voltage is removed from points E3 and E4, and the time delay of U1 and U2 has timed out. After the timing circuit has timed out, the switches will return to their original operating conditions. The output signal from inductor 110 to amplifier U4 normally remains disconnected therefrom for approximately two seconds to allow signals induced by eddy currents to damp out, after which magnetic surveillance returns to normal.

Output from amplifier U4 is modified to match the output from a much longer coil by using the low output impedance of U4 output transistors and a series matching resistor R20. There are two transistors in the output of U4 that allow the amplifier to have an output impedance of less than 0.5 ohms. Since this output impedance is so low in comparison to the 150–160 ohms of larger search coil which is being emulated, resistor R20 is added in series with the output of U4 to raise the output impedance of the developed search coil to 150 plus or minus 2 ohms. Output impedance then matches the output impedance of the larger coil.

The search coil used in the actuation mine simulator according to the present invention is 15 inches long and effectively replaces a standard 6 foot, 50 pound standard service mine search coil. The present invention was developed to replace the standard service mine search coil with a unit that was small enough to be easily assembled in a mine shop. The standard search coil is comprised of a selected number of turns of wire wound around a permaloy core. There is considerable variation in sensitivity among the different types of search coils used in the wide variety of service mines presently in use. These variations are associated with the difference in diameter and length of the core, the core material, the number of turns and size of wire in the coil, thickness of the protective jacket, and the general size and shape of the completed search coil. Each type search coil is designed to have particular characteristics.

Figure 2:
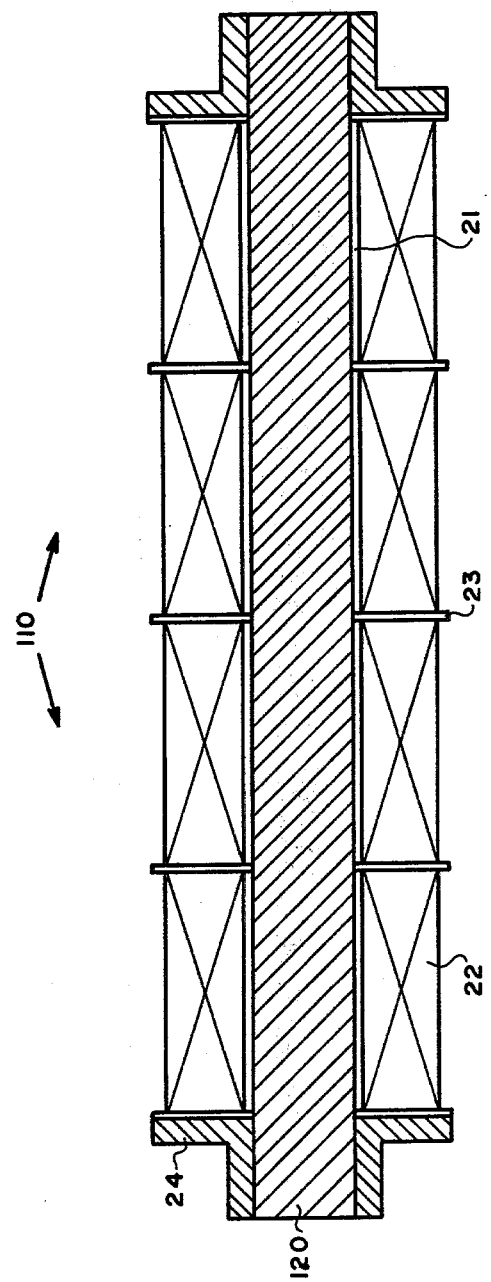
FIG. 2 illustrates a inductor according to the present invention.

Referring now to FIG. 2 there is shown an inductor according to the present invention. Inductor 110 comprises a metallic core 120. Core 120 may be made of Mu metal, which is machined to shape in a conventional manner and then hydrogen annealed at 2,030° F. for 2 to 4 hours. Upon this core is wrapped a 0.010 inch thick layer of glass tape 21. Upon this layer of tape 21 is wound 4 separate coils 22 which are connected with one another in series, and which are separated from one another by 1/16 inch epoxy-fiberglass separators 23. Each coil 22 comprises 30,000 turns of number 35 HF wire. End caps 24 machined from 1020 steel complete the basic coil assembly. End caps 24 may be made from any suitable material. The weight of inductor 110 including core 120, while unpotted, is approximately 10.8 pounds. The coil is finally potted in the conventional manner.

The null procedure for coarsely balancing the search coil is performed by adjusting R16 until the current flow through each half of R16 is nearly equal. A 100,000 ohm potentiometer is then connected between point 31 and points 32 and 33 as shown in FIG. 1. This potentiometer is then adjusted until the current flow in each half is equal. Currents are measured with an ammeter. Resistance of each half of the potentiometer is measured, and the potentiometer removed. Metal film resistors RP1 and RP1 having the previously measured values are then permanently connected between point 31 and points 32 and 33. The coil balance is then fine tuned by means of resistors R16, which is a cermet trimmer.

As shown in FIG. 1, switch U1 may be that electronic component commercially designated by number CD4047Ad/3, and U2 may be that electronic component commercially designated by number CD4017AD/3. Similarly, component U3 may be that electronic component commercially designated by number AD7516SD.

The present invention is used in the Actuation Mine Simulator System, and other inventions related thereto, for which patent applications were filed on the same date as the present application. These include the Planting and Storage Rack and Release Mechanism, Ser. No. 877,545, the Flare Release System, Ser. No. 877,547, the Actuation Mine Simulator, Ser. No. 879,286. Also, U.S. Pat. No. 3,960,087 to Beatty et al. may be used within the Actuation Mine Simulator System.

The invention has been described in an illustrative manner and it is to be understood that the terminology which has been used is intended to be in the nature of words of description rather than of limitation. Obviously, many modifications and variations of the present invention are possible in light of the above teaching. It is therefore to be understood that within the scope of the appended claims, the invention may be practiced otherwise than as specifically described.

What is claimed is:

1. A mine search coil simulator, comprising:
    a passive inductor for producing an electrical signal output in response to motion of a remote ferrous body;
    an electronic switch connected to said passive inductor;
    an operational amplifier connected to said electronic switch to receive a signal therefrom;
    a gain control circuit for controlling the gain of said operational amplifier connected thereto;
    an impedance matching circuit connected to said operational amplifier;
    a zero off-set for eliminating the effects of environmental electromagnetic fields connected to said gain control circuit;
    a pulse counter connected to said electronic switch;
    an astable multivibrator connected to said pulse counter for providing pulses thereto;
    a light-sensitive transistor having an emitter, a collector and a base, said emitter connected to said astable multivibrator; and
    a light-emitting diode having an anode and a cathode, said light-emitting diode configured to supply light to said base of said light-sensitive transistor in response to a control signal applied across said anode and said cathode.

2. A mine search coil simulator according to claim 1 wherein said passive inductor comprises:
    a metallic core; and
    a length of electrical conductor wound around said metallic core to define a plurality of separate coils connected in series.

3. A mine search coil simulator according to claim 1 wherein said gain control circuit includes a variable resistance.

4. A mine search coil simulator according to claim 1 wherein said impedance matching circuit comprises a resistance.

5. A mine search coil simulator according to claim 1 wherein said zero off-set circuit comprises a variable resistance.

* * * * *